Jan. 6, 1970 B. NEMEC ET AL 3,488,115
OVERHEAD MOUNTED PROJECTION SYSTEM
Filed June 15, 1967 4 Sheets-Sheet 1
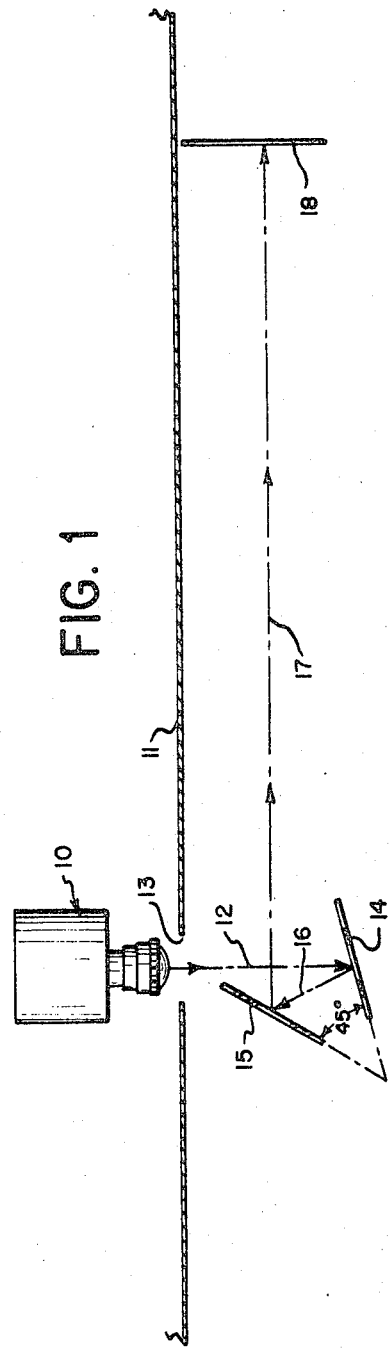
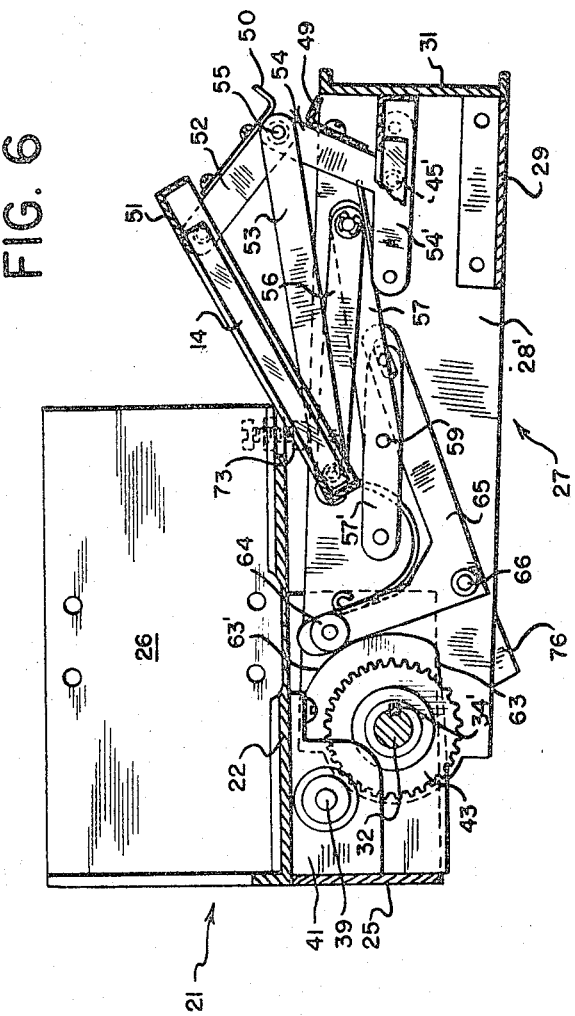
INVENTORS
BOYCE NEMEC
SAMUEL E. DAHLMAN
BY
ATTORNEYS

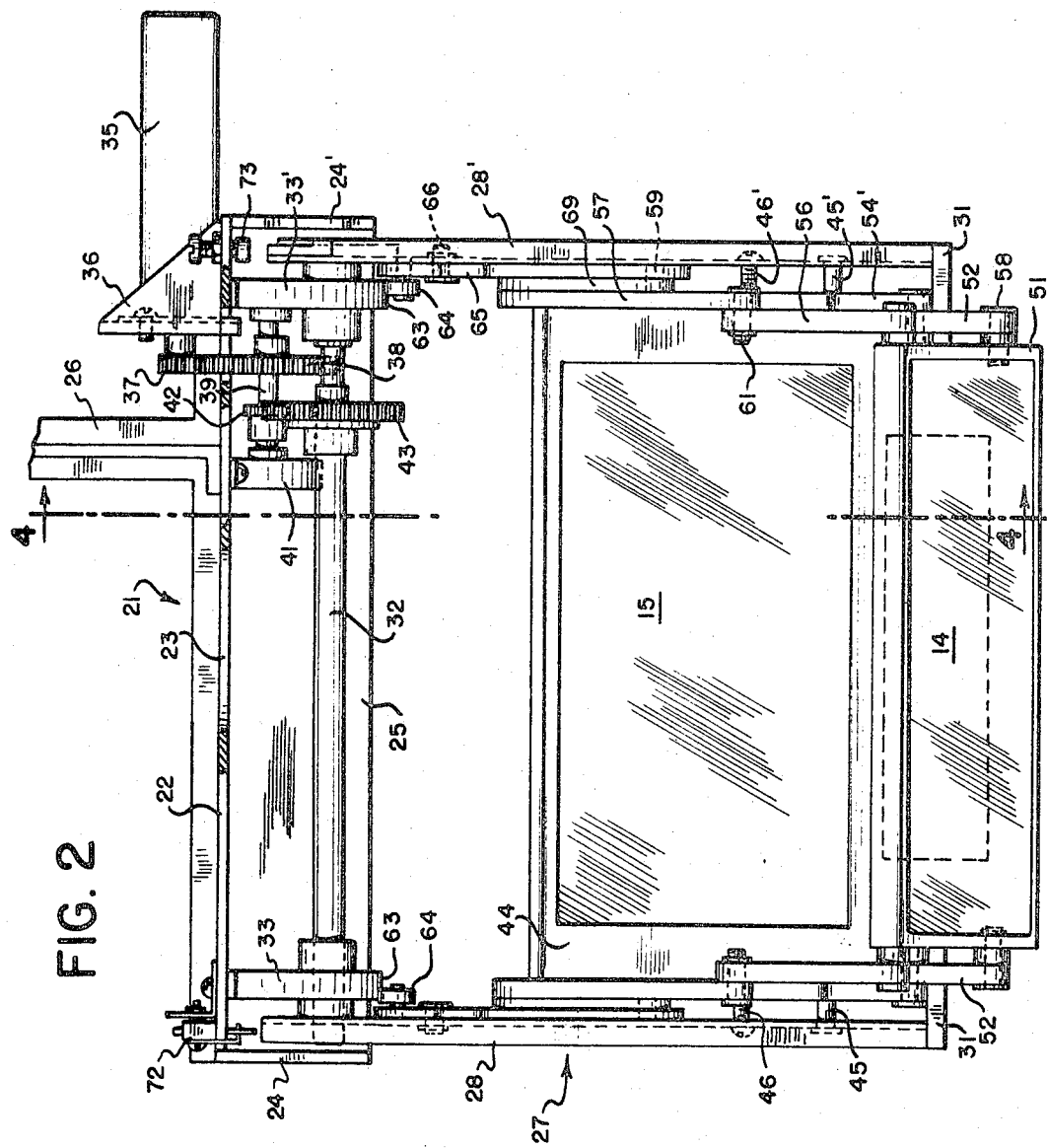

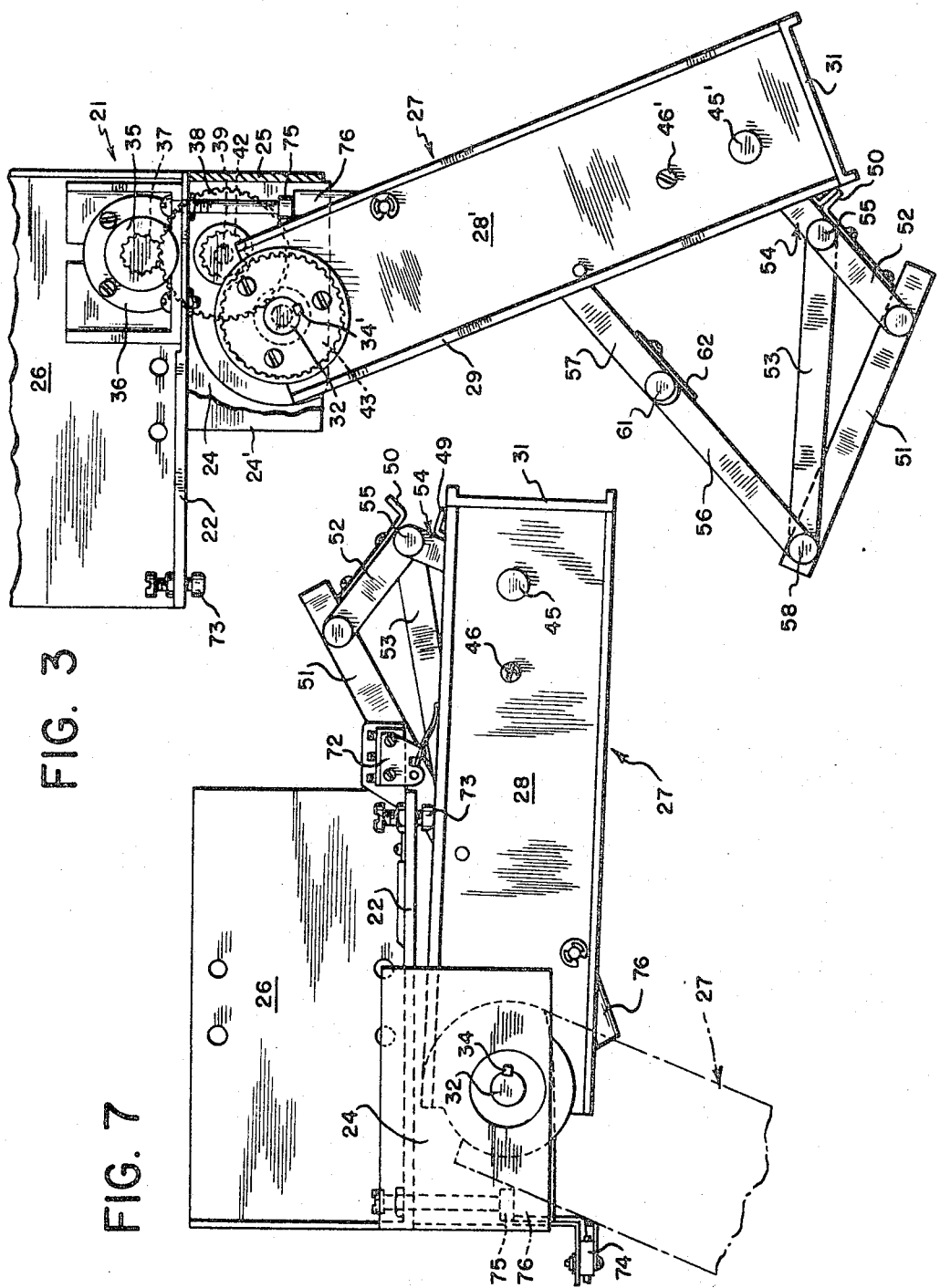

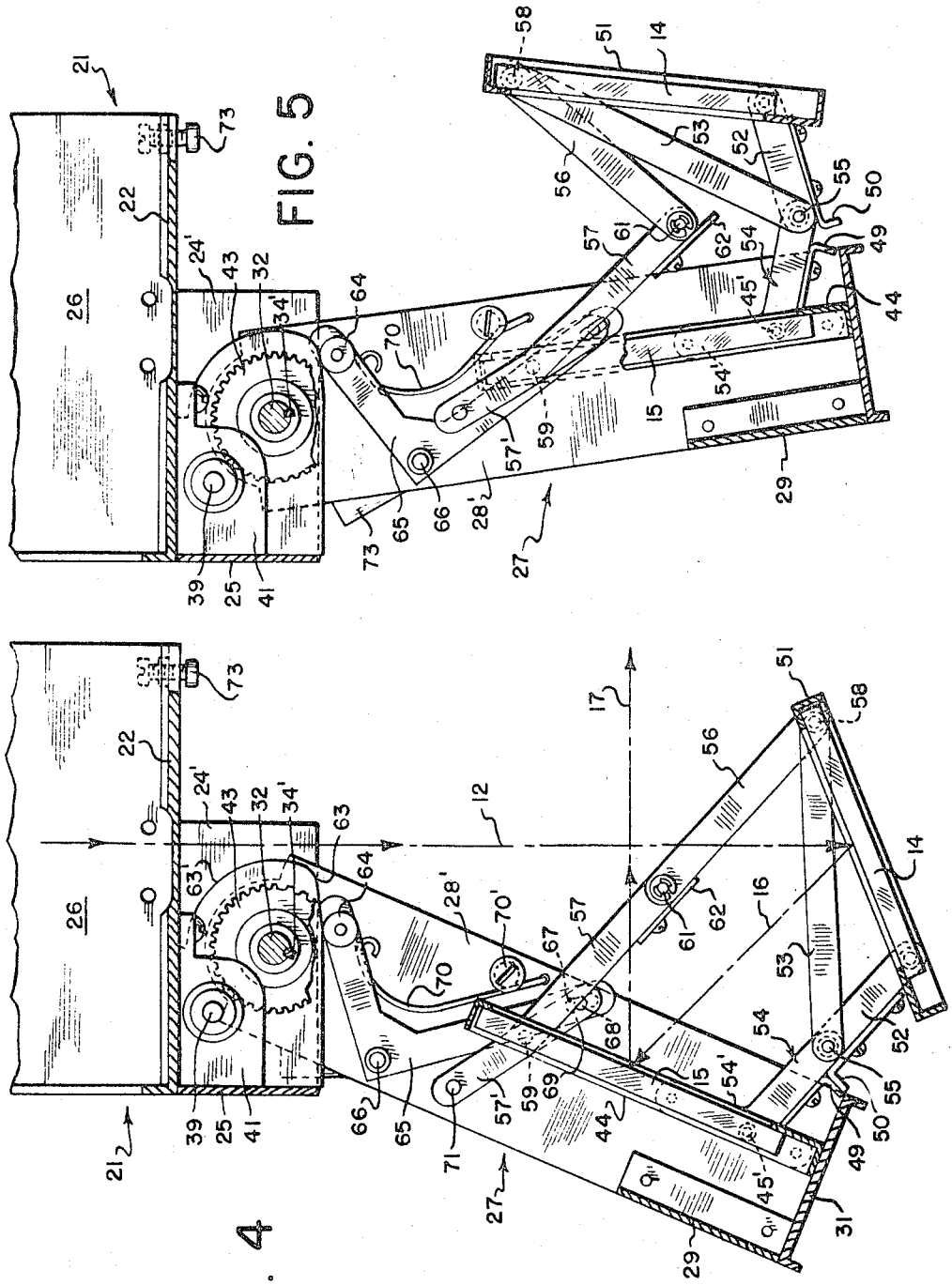

United States Patent Office 3,488,115
Patented Jan. 6, 1970

3,488,115
OVERHEAD MOUNTED PROJECTION SYSTEM
Boyce Nemec, Hastings-on-Hudson, and Samuel E. Dahlman, Flushing, N.Y., assignors to Inflight Motion Pictures, Inc., New York, N.Y., a corporation of Delaware
Filed June 15, 1967, Ser. No. 646,406
Int. Cl. G03b 21/28
U.S. Cl. 353—99                                         6 Claims

ABSTRACT OF THE DISCLOSURE

An overhead projector has a foldable penta-mirror system for directing the downwardly projected beam in a horizontal direction. A pivotally mounted frame carries one mirror and a second mirror is mounted on the frame by a foldable support. Rotation of the frame to operative and inoperative positions actuates the foldable support to unfolded and folded positions, respectively. A stop member limits the unfolded position of the frame to yield a desired generally horizontal beam direction.

BACKGROUND OF THE INVENTION

Motion picture projection equipment is now used in airplanes to provide entertainment during flight. In one such system, described in U.S. Patent 3,262,358, the projector is mounted in an overhead compartment extending downwardly from the ceiling. The projector is arranged to project a beam generally horizontally to a projection screen.

Some types of airplanes do not lend themselves to this type of installation, either because there is insufficient overhead room, or for structural or other reasons. Such installations require mounting the major portion of the projection equipment above the cabin ceiling. This presents a problem in bringing the beam below the ceiling and directing it to the projection screen.

Fixed optical systems projecting below the ceiling could be employed, but would present a hazard to passengers in traveling through the compartment. An optical system, retractable as a unit, might be employed, but involves problems of precise positioning as well as the ever-present problems in aircraft of lack of space and need for avoiding excess weight.

The present invention provides a projection system using a foldable mirror system which can readily be folded into the ceiling when not in use, does not require excessively precise positioning, is not unduly bulky when folded, and is relatively light in weight.

SUMMARY OF THE INVENTION

In accordance with the present invention, a projector is mounted overhead and positioned to project a beam downwardly. The projector, including supply and takeup reels, may be mounted above the ceiling so as to offer no obstruction to passage through the cabin. A foldable mirror system is then provided which can be folded up against or into a ceiling aperture when not in use, and unfolded downwardly into position to redirect the projected beam in a generally horizontal direction to a viewing screen.

A flat mirror unfolded to an approximate 45° angle would suffice to reflect the incident vertical beam in a horizontal direction. However, such a mirror would invert the image from top to bottom. This inversion could be taken into account by suitable orientation of the frames on the film. However, this would prevent the use of commercially available feature films since special prints would need to be made. This is highly undesirable both because of the printing cost and because the films could not then be used in an arrangement such as shown in the aforesaid patent.

The present invention employs a penta-mirror system which avoids these inversion problems and has further advantages particularly important in a projection system of this nature. One mirror is mounted on a movable frame which is pivotally attached to a stationary frame which in turn is attached to the projector housing or otherwise fixedly mounted with respect to the projector. The other mirror is mounted on the movable frame by foldable means. In the folded position the mirrors are folded together and the movable frame folded toward the stationary frame. This dual folding results in a compact folded arrangement which requires only a small vertical storage space.

For operation, the movable frame is rotated downwardly and means responsive to this movement actuates the foldable means to unfold the mirrors until they bear a 45° angle to each other. Stop means limits the travel of the movable frame so that, in its unfolded position, the downwardly projected beam is reflected by the two mirrors in a generally horizontal direction.

Advantageously the foldable means includes two laterally spaced pairs of lower pivoted link arms and two laterally spaced pairs of upper pivoted links. The lower link arms of each pair are fixedly attached to the movable frame and the mirror carried thereby, and the upper link arms of each pair are pivotally attached to the movable frame and mirror. The lengths of the link arms and links are predetermined to establish the 45° angle between the mirrors when unfolded. Pairs of laterally spaced fixed cams on the stationary frame and cam followers mounted on crank arms pivotally attached to the movable frame are provided, the crank arms engaging the upper links to produce folding and unfolding thereof. This provides a structure which is very rigid in its unfolded position, thus holding the mirrors rigidly at a 45° angle during use, and yet is of sufficiently light weight.

BRIEF DESCRIPTION OF THE DRAWINGS

FIG. 1 shows the overall arrangement of the projection system and the optical paths involved;

FIG. 2 is a front view of the foldable penta-mirror system in the unfolded (operating) position thereof;

FIG. 3 is a side view of the unfolded mirror system taken from the right of FIG. 2;

FIG. 4 is a section of the unfolded mirror system taken along the line 4—4 of FIG. 2;

FIGS. 5 and 6 are cross-sections showing partially and completely folded positions of the mirror system taken in the same plane as FIG. 4; and FIG. 7 is a side view of the completely folded mirror system taken from the left of FIG. 2.

DESCRIPTION OF THE PREFERRED EMBODIMENT

Referring to FIG. 1, a projector 10 is shown mounted above the ceiling 11 of a viewing compartment such as the cabin of an airplane. The projector may be mounted by any suitable means (not shown) and is positioned to project the beam downwardly as shown at 12 through an aperture 13 in the ceiling. A mirror system comprising mirrors 14 and 15, making a 45° angle to each other, is positioned to receive the downwardly projected beam 12. Mirror 14 reflects the beam along line 16 to mirror 15, and the latter reflects the beam in a generally horizontal direction as shown by line 17, to a projection screen 18. With the mirror system mounted close to the ceiling, it will ordinarily be necessary for the emergent beam 17 to be directed somewhat downward in order to register the projected picture with the projection screen 18.

With mirrors 14 and 15 at 45° as indicated, and with incident and emergent beams as shown, the system functions like a penta prism and consequently is called a penta-mirror system. The angle between the incident beam axis 12 and emergent beam axis 17 is 90°. The system does not invert or revert the image, and consequently standard projection equipment and film can be employed. Further, if the 45° angle between mirrors is maintained a 90° angle between incident and emergent beams is obtained even though the angle at which beam 12 strikes mirror 14 changes somewhat. Thus the angular positioning of the mirror system is not extremely critical, although reasonable care in positioning is desirable.

To obtain a downward tilting of the emergent beam 17, the projector 10 may be tilted through the required angle. Advantageously the mirror system is mounted on the projector so as to tilt therewith.

Referring to FIGS. 2, 3 and 4, these show the penta-mirror system in its lower unfolded position, ready for operation. A stationary frame generally designated as 21 is provided for attaching the mirror system to the projector 10 or to suitable support means above the ceiling. As specifically shown, it includes a top plate 22 having an aperture 23 therein through which the projected beam passes. Side plates 24, 24' and a back plate 25 are attached to the top plate 22 by suitable means (not shown). A mounting bracket 26 is attached to the top plate 22.

A movable frame generally designated as 27 is formed with side plates 28, 28', a bottom plate 29 and an end plate 31. Plate 29 is shown extending only partially across the bottom, for convenience of access. A suitable panel may be placed over the bottom to cover the opening in the ceiling when in folded position.

The movable frame 27 is pivotally mounted on the stationary frame by shaft 32 rotating in bearings in cam brackets 33, 33'. Shaft 32 is keyed to the movable frame by keys 34, 34' (FIGS. 7 and 4). Cam brackets 33, 33' are attached to the top and back plates 22, 25 of the stationary frame, as by screws, etc. (not shown).

A reversible drive motor 35 is mounted on a bracket 36 attached to the top plate 22 of the stationary frame. A gear 37 drives gear 38 keyed to an intermediate shaft 39 which rotates in bearings mounted in cam bracket 33' and in a shaft supporting bracket 41 attached to the upper plate 22. Gear 42 is keyed to shaft 39 and drives a gear 43 which is keyed to shaft 32. Motor 35 is provided with an internal speed reduction worm drive, and the gear train provides additional reduction so that a small high speed motor can move the movable frame 27 slowly to its unfolded and folded positions. The irreversibility of the worm drive serves to hold the frame in either position.

Mirror 15 is a front surface mirror mounted on the movable frame 27. The mirror is mounted in a mirror frame 44 which is held between side plates 28, 28' by pins 45, 45' and screws 46, 46' providing for lateral positioning. Tilting adjustments may be provided if desired.

Mirror 14 is mounted on a frame 51. On each side of frame 51 is a link 52 and a cross link 53 which together form a link arm fixed in position relative to the mirror frame 51. A link arm 54 is fixedly attached to the movable frame 27 on each side thereof. As speciifically shown, arm 54 has an angled foot 54' which is attached to the side of the mirror frame 44, the latter being attached to the side plates. The link arms 52 and 54 are pivoted at 55 and are called the lower pivoted link arms. A bracing plate 49 is attached to the two arms 54 (one on each side of mirror frame 44) to insure a rigid structure. Similarly, a bracing plate 50 is attached to the two links 52 on opposite sides of the mirror frame.

A pair of upper links 56, 57 are provided on each side of the movable frame. Link 56 is pivoted at 58 to the mirror frame 51 and link 57 is pivoted at 59 to the mirror frame 44. The latter is fixedly mounted on the movable frame 27 so that in effect link 57 is pivoted on the movable frame. The links are pivoted together at 61.

As best seen in FIG. 4, the lower link arms 52, 54 and upper links 56, 57 have lengths predetermined to hold mirror 14 at a 45° angle to mirror 15 in the unfolded position shown. Advantageously, when in this position the pivot points 58, 59 and 61 of the upper links are in alignment, and a stop plate 62 attached to link 57 prevents the upper links from moving beyond the aligned position.

In moving from unfolded to folded positions, the upper links fold toward each other as seen in FIG. 5, the mirror frame 51 rotating about pivot point 55.

The folding and unfolding take place during the folding and unfolding of the movable frame 27 with respect to the fixed frame 21. To effect this action, the cam brackets 33, 33' are provided with cam surfaces 63, 63', engaged by a cam follower roller 64 carried by one leg of a crank arm 65 pivotally mounted at 66 to the side of movable frame 27. A cam and cam follower are provided on each side of the mirror system. The other arm of crank arm 65 has a slot 67 engaging pin 68.

Pin 68 is fixed with respect to link 57. In this embodiment mechanical linkage considerations require the pin to be somewhat offset as indicated. Accordingly, link 57 has a slightly angled extension 57' to which a bar 69 (FIG. 2) is fixedly attached, as by pin 71 and pivot 59. Pin 68 is mounted at the end of bar 69. A spring 70 is wound around pin 70' affixed to the side of the movable frame 27, and bears against crank arm 65 to hold cam follower 64 against the cam surface.

Comparing FIG. 4 with FIG. 5, during the folding operation movable frame 27 is driven counterclockwise by the motor and gear train. During the initial portion of the folding operation cam follower 64 rides along the flat cam surface 63 and consequently crank arm 65 is rotated clockwise with respect to the movable frame 27. This causes pin 68 to rotate link 57 clockwise about its pivot point 59, hence starting the folding action of the mirror system. As the movement of frame 27 continues, the folding action of the mirror system is completed when the cam follower reaches the junction of surfaces 63, 63' of the cam. From there on the cam follower rides along surfaces 63' of constant radius so that no further folding of the mirror system takes place.

FIGS. 6 and 7 show the final position with the mirrors folded together and the movable frame folded toward the stationary frame. Stop means are provided to limit the movement of movable frame 27 at the end of the folding operation. Thus a switch 72 is provided to be actuated by the movable frame as the folded position is reached, and deenergizes the motor. To guard against damage in case the switch fails, a mechanical bumper stop 73 is mounted on upper plate 22 of the fixed frame in position to engage a side of the movable frame 27.

During unfolding, the movable frame 27 rotates downwards from the position shown in FIGS. 6 and 7 toward the position shown in FIG. 5. As cam follower 64 rides off the radial cam surface 63' on to the flat surface 63, spring 70 maintains the follower against the cam surface, thereby causing crank arm 65 to begin rotating counterclockwise with respect to the movable frame. Pin 68 starts moving link 57 counterclockwise about pivot point 59 to unfold the upper pair of links.

At the end of the unfolding action, the upper links 56, 57 have their pivot points in alignment as shown in FIG. 4, and are held from further movement by stop 62. In this position the mirrors bear a 45° angle to each other, thus forming a penta-mirror system.

In the final position of the movable frame 27, incident beam 12 should make an angle of 22½° with respect to the normal to mirror 14. As above mentioned, the penta-mirror system allows some latitude in this respect. For this to obtain, the surface of mirror 15 makes an angle of 22½° with beam 12. The switch 74 (FIG. 7) is mounted to be engaged by a side of the movable frame when the proper angle has been reached, and deenergizes the motor, thus serving as the desired stop means. To guard against damage in case the switch fails, a mechanical bumper stop 75 is mounted on the stationary frame in position to engage a wedge 76 attached to the side of the movable frame.

It will be observed that the folding and unfolding of the mirror system involve two distinct but coordinated folding actions. One is the folding of the movable frame 27 with respect to the fixed frame 21, and the other is the folding of the mirror 14 with respect to the movable frame. This enables the mirror system to be mounted so that in its completely fold position (FIGS. 6, 7) it is entirely above the ceiling of the viewing compartment. The cam mechanism is arranged so that there is no appreciable movement of the mirror 14 with respect to the movable frame 27 until the latter has moved downwards sufficiently so that the mirror will clear the ceiling as it is unfolded. This is accomplished by making the initial portion 63' of the cam surface a radial surface. Then, toward the lower position of the movable frame, the mirror is rapidly unfolded to its operating position. The reverse takes place in folding the system back into the ceiling.

The invention has been described in connection with a specific embodiment thereof. It will be understood that modifications may be made in the detailed linkages and structure described, if desired.

We claim:

1. A projection system comprising a projector mounted overhead and positioned to project a beam downwardly, a foldable penta-mirror system positioned, when unfolded to receive said downwardly projected beam and re-direct the beam in a generally horizontal direction, said foldable penta-mirror system including a stationary frame and a movable frame pivotally mounted thereon, a first mirror mounted on said movable frame, a second mirror, foldable means mounted on said movable frame for mounting said second mirror at an angle of substantially 45° to said first mirror when in unfolded position, means for rotating said movable frame from an upper folded position to a lower unfolded position and vice versa, means responsive to rotation of said movable frame to folded and unfolded positions thereof for actuating said foldable means to folded and unfolded positions thereof, respectively, and stop means for limiting the rotation of said movable frame in the unfolding direction to a position in which the downwardly projected beam is reflected by said second mirror to said first mirror and by said first mirror in a generally horizontal direction.

2. A system according to claim 1 in which said foldable means includes foldable links for establishing said 45° angle when unfolded, and said means for actuating the foldable means includes cam means mounted on said stationary frame and cooperating cam follower means mounted on said movable frame for actuating said foldable links to the unfolded position thereof as the movable frame is rotated to the unfolded position thereof.

3. A system according to claim 1 in which said foldable means includes two laterally spaced pairs of lower pivoted link arms and two laterally spaced pairs of upper pivoted links, each pair of lower link arms having one arm fixedly attached to said movable frame and the other arm fixedly attached to said second mirror, each pair of upper links having one link pivotally attached to said movable frame and the other link pivotally attached to said second mirror, and said means for actuating the foldable means includes cam means mounted on said stationary frame and cooperating cam follower means mounted on said movable frame for actuating said pairs of link arms and links to the unfolded position thereof as the movable frame is rotated to the unfolded position thereof, the lengths of said pairs of link arms and links being predetermined to establish said 45° angle in the unfolded positions thereof.

4. A system according to claim 3 in which the links of each upper pair have the pivot points thereof in substantial alignment in the unfolded position thereof, and including stop means for preventing movement of the links of a pair beyond the position of said alignment.

5. A system according to claim 4 in which said cam means includes a fixed cam member, said cam follower means includes a cam follower mounted on one leg of a crank arm pivotally attached to said movable frame, and the other leg of said crank arm engages the link of an upper pair of links which is pivotally attached to the movable frame.

6. A system according to claim 5 including laterally spaced pairs of said cam members, crank arms and cam followers, respective other legs of the crank arms engaging links of respective upper pairs.

References Cited

UNITED STATES PATENTS

| 1,133,869 | 3/1915 | McAuley | 353—99 X |
| 1,721,425 | 7/1929 | Winzenburg | 352—136 |
| 3,387,535 | 6/1968 | Bennett | 352—78 X |
| 3,391,979 | 7/1968 | Lessler | 352—104 X |

FOREIGN PATENTS 832,207   1/1952   Germany.

NORTON ANSHER, Primary Examiner

M. H. HAYES, Assistant Examiner

U.S. Cl. X.R.

350—23; 353—64, 73, 78